(12) United States Patent
Yang

(10) Patent No.: US 9,424,876 B2
(45) Date of Patent: Aug. 23, 2016

(54) SYSTEMS AND METHODS FOR SYNC MARK MIS-DETECTION PROTECTION

(71) Applicant: LSI Corporation, San Jose, CA (US)

(72) Inventor: Shaohua Yang, Santa Clara, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 282 days.

(21) Appl. No.: 13/896,048

(22) Filed: May 16, 2013

(65) Prior Publication Data

US 2014/0281841 A1    Sep. 18, 2014

Related U.S. Application Data

(60) Provisional application No. 61/785,947, filed on Mar. 14, 2013.

(51) Int. Cl.
| | | |
|---|---|---|
| *H04L 7/00* | (2006.01) | |
| *G11B 20/10* | (2006.01) | |
| *G11B 20/18* | (2006.01) | |
| *G06F 11/263* | (2006.01) | |

(52) U.S. Cl.
CPC ........ *G11B 20/10305* (2013.01); *G06F 11/263* (2013.01); *G11B 20/10361* (2013.01); *G11B 20/1816* (2013.01); *G11B 20/1037* (2013.01)

(58) Field of Classification Search
CPC .................................................. G06F 11/263
See application file for complete search history.

(56) References Cited

U.S. PATENT DOCUMENTS

| | | | |
|---|---|---|---|
| 5,629,912 A | 5/1997 | Okawa | |
| 6,023,386 A | 2/2000 | Reed | |
| 6,741,524 B2 | 5/2004 | Ichihara et al. | |
| 6,856,480 B2 | 2/2005 | Kuki | |
| 6,934,229 B2 | 8/2005 | Fujiwara | |
| 7,167,432 B2 | 1/2007 | Chiang | |
| 7,199,959 B1 | 4/2007 | Bryant | |
| 7,403,460 B2 | 7/2008 | Nagai | |
| 7,423,827 B2 | 9/2008 | Neville | |
| 7,583,459 B1 | 9/2009 | Cheng | |
| 7,738,200 B2 | 6/2010 | Annampedu | |
| 7,768,437 B2 | 8/2010 | Annampedu | |
| 7,813,065 B2 | 10/2010 | Annampedu | |
| 7,821,730 B2 | 10/2010 | Cao | |
| 7,881,164 B1 * | 2/2011 | Han ......................... | G11B 5/09 360/39 |
| 7,929,237 B2 | 4/2011 | Grundvig | |

(Continued)

OTHER PUBLICATIONS

U.S. Appl. No. 13/714,233, Unpublished (filed Dec. 13, 2012) (Haotian Zhang).

(Continued)

*Primary Examiner* — Sam K Ahn
*Assistant Examiner* — Fabricio R Murillo Garcia

(57) ABSTRACT

The present inventions are related to systems and methods for data processing, and more particularly to systems and methods for detecting patterns in a data stream. As an example, a data processing system is discussed that includes a sync mark detection circuit and a sync quality output circuit. The sync mark detection circuit is operable to identify a predefined pattern in a received data set, where identification of the predefined pattern results is asserting a sync found output, and where a preamble pattern precedes the predefined pattern in the received data set. The sync quality output circuit is operable to provide a sync mark quality metric indicating a similarity between the preamble pattern and the received data set within a region preceding the predefined pattern.

19 Claims, 6 Drawing Sheets

(56) References Cited

U.S. PATENT DOCUMENTS

| | | |
|---|---|---|
| 7,974,034 B1 | 7/2011 | Han |
| 8,014,099 B2 | 9/2011 | Mathew |
| 8,027,117 B1 | 9/2011 | Sutardja |
| 8,049,983 B1 | 11/2011 | Han |
| 8,054,573 B2 | 11/2011 | Mathew |
| 8,054,931 B2 | 11/2011 | Annampedu |
| 8,059,349 B2 | 11/2011 | Annampedu |
| 8,098,451 B2 | 1/2012 | Graef |
| 8,154,818 B2 | 4/2012 | Mathew |
| 8,154,972 B2 | 4/2012 | Ratnakar Aravind |
| 8,174,784 B2 | 5/2012 | Grundvig |
| 8,174,949 B2 | 5/2012 | Ratnakar Aravind |
| 8,213,106 B1 | 7/2012 | Guo |
| 8,237,597 B2 | 8/2012 | Liu |
| 8,243,381 B2 | 8/2012 | Annampedu |
| 8,254,049 B2 | 8/2012 | Annampedu |
| 8,261,171 B2 | 9/2012 | Annampedu |
| 8,264,933 B1* | 9/2012 | Oberg et al. ............... 369/59.25 |
| 8,325,433 B2 | 12/2012 | Zhang et al. |
| 8,498,071 B2 | 7/2013 | Grundvig et al. |
| 8,565,047 B2 | 10/2013 | Wilson |
| 2002/0005795 A1 | 1/2002 | Asano |
| 2004/0252394 A1 | 12/2004 | Hamaguchi |
| 2006/0132953 A1 | 6/2006 | Asakura |
| 2007/0008643 A1 | 1/2007 | Brady |
| 2007/0139805 A1 | 6/2007 | Mead |
| 2007/0297079 A1* | 12/2007 | Motwani ............ G11B 20/1217 360/51 |
| 2008/0019031 A1 | 1/2008 | Chu |
| 2010/0061490 A1 | 3/2010 | Noeldner |
| 2010/0067628 A1 | 3/2010 | Buehner |
| 2010/0118426 A1 | 5/2010 | Vikramaditya |
| 2010/0142078 A1 | 6/2010 | Annampedu |
| 2010/0149940 A1 | 6/2010 | Nakata |
| 2011/0043938 A1 | 2/2011 | Mathew |
| 2011/0157737 A1 | 6/2011 | Grundvig |
| 2011/0209026 A1* | 8/2011 | Xia et al. ..................... 714/752 |
| 2011/0292535 A1* | 12/2011 | Haratsch ............ G11B 5/59616 360/51 |
| 2012/0036173 A1 | 2/2012 | Annampedu |
| 2012/0068870 A1 | 3/2012 | Liu et al. |
| 2012/0084336 A1 | 4/2012 | Yang |
| 2012/0087035 A1 | 4/2012 | Graef |
| 2012/0106607 A1 | 5/2012 | Miladinovic |
| 2012/0120784 A1 | 5/2012 | Yang |
| 2012/0124241 A1 | 5/2012 | Yang |
| 2012/0124454 A1 | 5/2012 | Liu et al. |
| 2012/0134042 A1 | 5/2012 | Annampedu |
| 2012/0134043 A1 | 5/2012 | Annampedu |
| 2012/0155587 A1 | 6/2012 | Annampedu |
| 2012/0182643 A1 | 7/2012 | Zhang |
| 2012/0236428 A1 | 9/2012 | Xia |

OTHER PUBLICATIONS

U.S. Appl. No. 13/685,990, Unpublished (filed Nov. 27, 2012) (Haitao Xia).

U.S. Appl. No. 13/529,572, Unpublished (filed Jun. 21, 2012) (Shaohua Yang).

U.S. Appl. No. 13/316,899, Unpublished (filed Dec. 12, 2011) (Haitao Xia).

U.S. Appl. No. 13/242,983, Unpublished (filed Sep. 23, 2011) (Jeffrey P. Grundvig).

U.S. Appl. No. 13/173,088, Unpublished (filed Jun. 30, 2011) (Jeffrey P. Grundvig).

U.S. Appl. No. 13/100,021, Unpublished (filed May 3, 2011) (Haitao Xia).

U.S. Appl. No. 13/096,873, Unpublished (filed Apr. 28, 2011) (Ross S. Wilson).

U.S. Appl. No. 13/186,267, Unpublished (filed Jul. 19, 2011) (Haitao Xia).

* cited by examiner

SYSTEMS AND METHODS FOR SYNC MARK MIS-DETECTION PROTECTION

CROSS REFERENCE TO RELATED APPLICATION

The present application claims priority to U.S. Pat. App. No. 61/785,947 entitled "Systems and Methods for Sync Mark Mis-Detection Protection" and filed on Mar. 14, 2013 by Yang. The entirety of the aforementioned reference is incorporated herein by reference for all purposes.

FIELD OF THE INVENTION

The present inventions are related to systems and methods for data processing, and more particularly to systems and methods for detecting patterns in a data stream.

BACKGROUND OF THE INVENTION

Various circuits have been developed that provide for identifying synchronization marks within a data stream. As an example, a synchronization mark is identified based upon a threshold comparison. Such a threshold comparison approach depends highly upon determining an appropriate threshold for comparison. Where the selected threshold is too high, sync marks will be missed. Alternatively, where the selected threshold is too low, sync marks may be incorrectly identified. Either case is problematic for proper data processing.

Hence, for at least the aforementioned reasons, there exists a need in the art for advanced systems and methods for sync mark identification.

BRIEF SUMMARY OF THE INVENTION

The present inventions are related to systems and methods for data processing, and more particularly to systems and methods for detecting patterns in a data stream.

Various embodiments of the present invention provide data processing systems that include: a sync mark detection circuit operable to identify a predefined pattern in a received data set where identification of the predefined pattern results is asserting a sync found output; a distance calculation circuit operable to determine a distance from a preceding occurrence to assertion of the sync found output; and a sync output circuit operable to assert a sync mark detected output corresponding to the sync found output when the distance is less than a threshold value.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
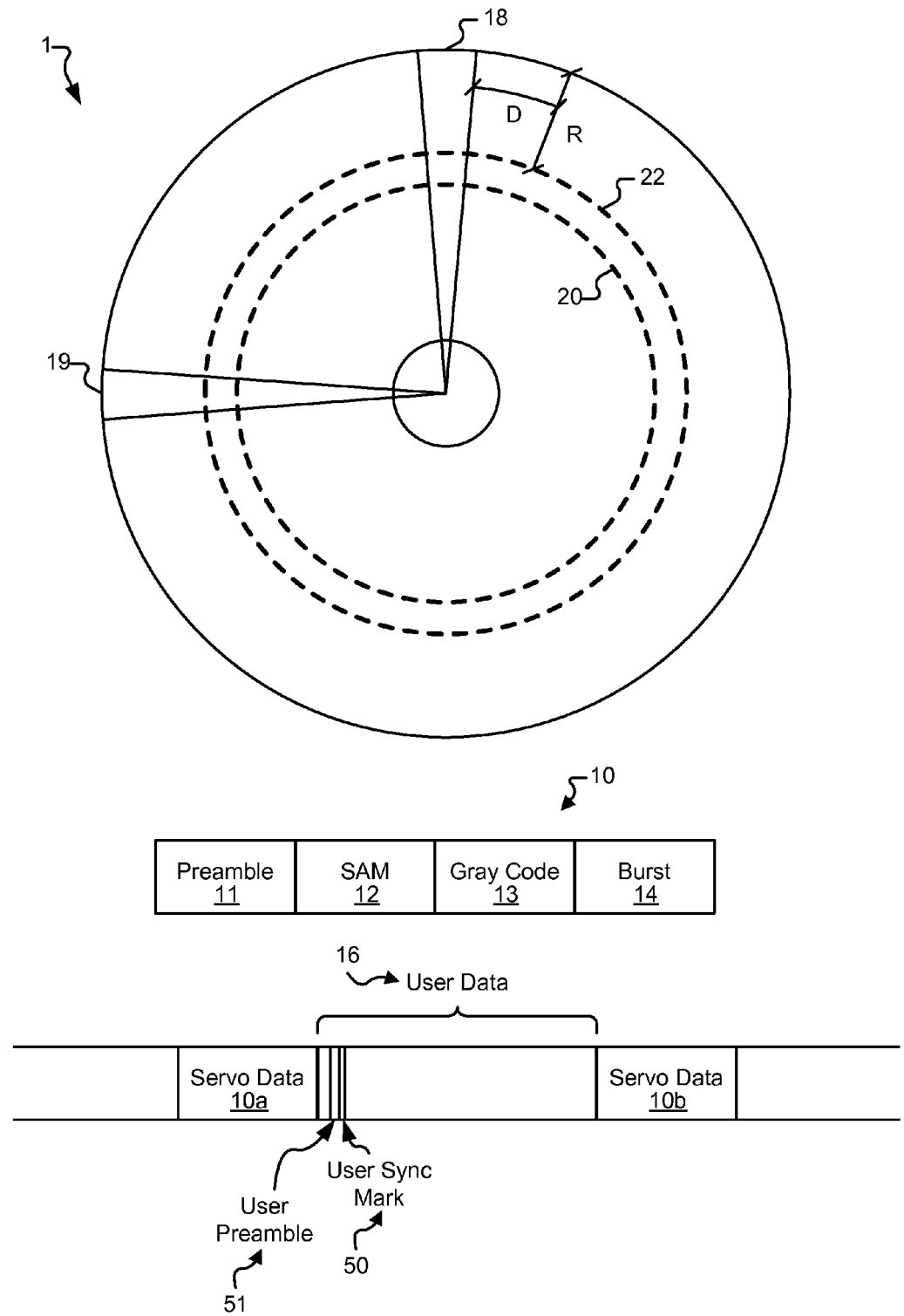
FIG. 1 is a block diagram of a known magnetic storage medium and sector data scheme consistent with existing art.

The present inventions are related to systems and methods for data processing, and more particularly to systems and methods for detecting patterns in a data stream.

Various embodiments of the present invention provide data processing systems that include, a sync mark detection circuit, a distance calculation circuit, and a sync output circuit. The sync mark detection circuit is operable to identify a predefined pattern in a received data set, and to assert a sync found output when the predefined pattern is identified. The distance calculation circuit is operable to determine a distance from a preceding occurrence to assertion of the sync found output. The sync output circuit is operable to assert a sync mark detected output corresponding to the sync found output when the distance is less than a threshold value. In some cases, the threshold value is programmable. In various cases, the threshold value is greater than the length of the predefined pattern. In some cases, the received data set further includes a preamble pattern, and the preceding occurrence is a detected end of the preamble pattern. In some cases, the preamble pattern is a defined length. In some such cases, the defined length is greater than the length of the predefined pattern. In various instances of the aforementioned embodiments, the sync output circuit is further operable to assert a mis-identified sync output when the sync found output is asserted when the distance is greater than the threshold value. In some cases, the system is implemented as part of an integrated circuit. In various cases, the system is implemented as part of a storage device or a wireless communication device.

In various instances of the aforementioned embodiments, the received data is derived from a user data region of a storage medium. In some cases, the preceding occurrence is within the user data region of the storage medium. In other cases, the preceding occurrence is within a servo data region of the storage medium, and wherein the servo data region directly precedes the user data region.

Other embodiments of the present invention provide data processing systems that include a sync mark detection circuit, and a sync quality output circuit. The sync mark detection circuit is operable to identify a predefined pattern in a received data set. Identification of the predefined pattern results is asserting a sync found output. A preamble pattern precedes the predefined pattern in the received data set. The sync quality output circuit is operable to provide a sync mark quality metric indicating a similarity between the preamble pattern and the received data set within a region preceding the predefined pattern. In some cases, the data processing system further includes a sync output circuit operable to assert a sync mark detected output corresponding to the sync found output when the sync mark quality metric is less than a threshold value. In other cases, the sync output circuit is further operable to assert a mis-identified sync output when the sync found output is asserted when a distance is greater than the threshold value.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, the servo data generally includes a preamble pattern 11 followed by a servo address mark 12 (SAM). Servo address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 may include one or more sets of data that are stored to storage medium 1. The data sets may include user synchronization information some of which may be used as a mark to establish a point of reference from which processing of the data within user data region 16 may begin processing.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18. Once the user data region is reached, a user sync mark 50 is detected and used as a reference point from which data processing is performed. User sync mark 50 is preceded by a user preamble 51.

As used herein, the phrase "sync mark" is used in its broadest sense to mean any pattern that may be used to establish a point of reference. Thus, for example, a sync mark may be user sync mark 50 as is known in the art, or one or more portions of servo data bit patterns 10. Based upon the disclosure provided herein, one of ordinary skill in the art may recognize other sync marks that could be used in relation to different embodiments of the present invention.

It has been determined that some sync mark detection algorithms are prone to misidentifying non-sync mark data as a sync mark when the actual sync mark has been destroyed due to media defects or thermal asperity. One such sync mark detection algorithm is that discussed in U.S. patent application Ser. No. 12/946,048 entitled "Systems and Methods for Sync Mark Detection" and filed Nov. 15, 2010. The entirety of the aforementioned reference is incorporated herein for all purposes.

Further, it has been found that occasionally user data will include sufficient similarity to a sync mark to result in a false positive sync mark detection. Some embodiments of the present invention utilize a sync mark detection algorithm to identify a possible sync mark, but with a condition that the identified sync mark must occur within an acceptable ranged of a preceding occurrence. In some embodiments of the present invention, the preceding occurrence is an end of preamble identifier occurring at some point before a sync mark would be expected. This approach helps to avoid mis-detection of sync marks (i.e., false positives).

Figure 2:
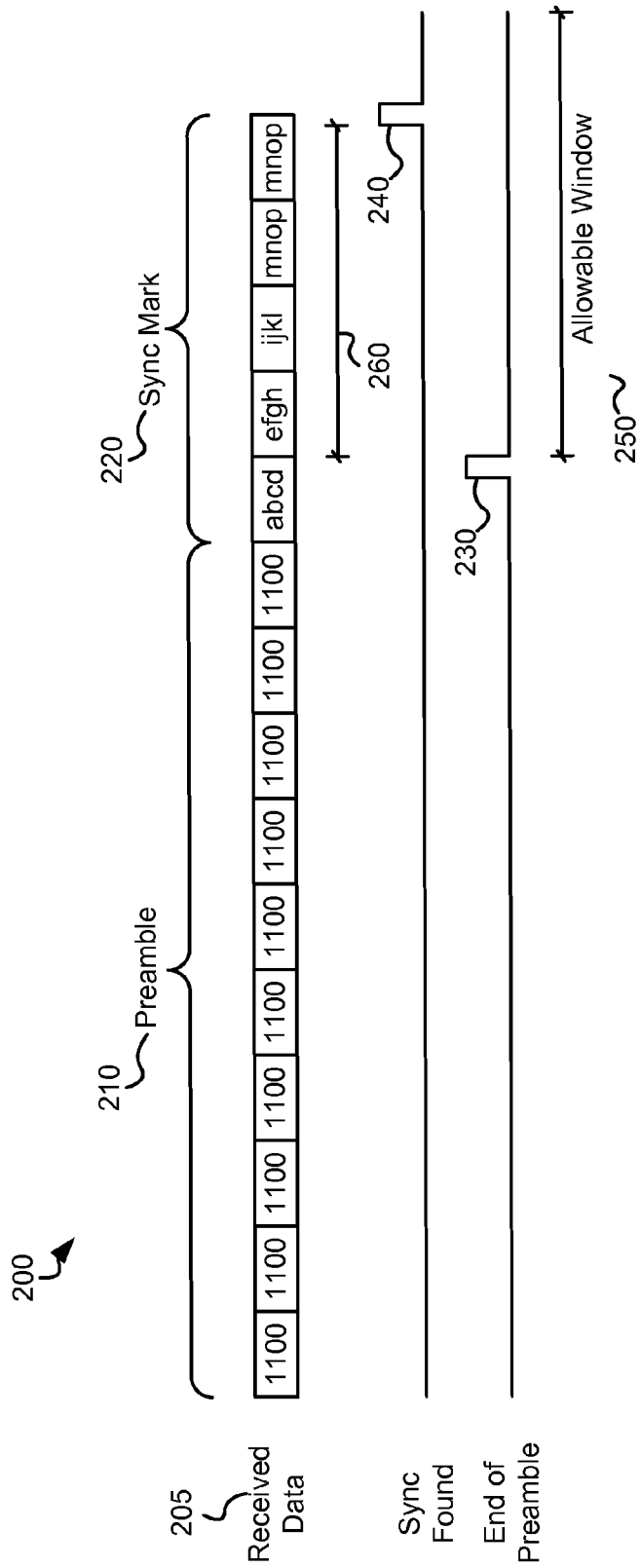
FIG. 2 is a timing diagram showing an example of a sync mark detected within an allowable window in accordance with one or more embodiments of the present invention.

Turning to FIG. 2, a timing diagram 200 shows an example of a sync mark detected within an allowable window 250 in accordance with one or more embodiments of the present invention. Following timing diagram 200, a preamble pattern 210 including a number of repeating bit series is shown followed by a sync mark pattern 220. As shown, the repeating bit series is a 2T series (i.e., '1100'). Based upon the disclosure provided herein, one of ordinary skill in the art will recognize other repeating patterns that may be used in relation to different embodiments of the present invention.

An end of preamble signal 230 is asserted after the last of the repeating bit series are detected. In some embodiments of the present invention, the end of preamble signal 230 is detected by an end of preamble detector circuit that calculates a Euclidean distance between a defined number of bits of received data 205. In some embodiments of the present invention, the defined number of bits of received data 205 is twenty (20). The Euclidean distance is calculated in accordance with the following equation:

$$\text{Euclidean Distance} = \sum_{k=0}^{20} (ReceivedData[k] - KnownPreamblePattern[k])^2,$$

where k indicates a particular bit pair being compared, and received data 205 and the preamble pattern are assumed to be aligned. Where received data 205 is error free, the calculated Euclidean distance will be zero when preamble pattern 210 is being received as received data 205, and will increase dramatically when a sync mark pattern 220 begins to be received as received data 205. Where preamble pattern 210 is not noiseless, the calculated value of the Euclidean distance will be greater than zero. However, where the noise is not overwhelming to the signal, the calculated value of the Euclidean distance will still increase detectably between the transition from preamble pattern 210 to a sync mark pattern 220. Once the calculated Euclidean distance exceeds an EOP threshold value, end of preamble signal 230 is asserted as a logic '1'. The location where end of preamble signal 230 is asserted is referred to as "L1".

A known sync mark pattern is also compared against received data 205, and a sync found signal 240 is asserted as a logic '1' when a match is detected. In one embodiment of the present invention, a Euclidean distance between sync mark pattern 220 and a known sync mark pattern is calculated in accordance with the following equation:

$$\text{Euclidean Distance} = \sum_{k=0}^{20}(ReceivedData[k] - KnownSyncMarkPattern[k])^2,$$

where k indicates a particular bit pair being compared. Where the calculated Euclidean distance is less than an SM threshold value, sync found signal 240 is asserted as a logic '1'. The location where sync found signal 240 is asserted is referred to as "L2". Where L2−L1 (represented by a distance 260) is less than or equal to an expected distance threshold (represented by an allowable window distance 250), sync mark found signal 240 is accepted as correct. Alternatively, where L2-L1 (represented by distance 260) is greater than the expected distance threshold (represented by allowable window distance 250), sync found signal 240 is identified as unreliable and may be used or rejected depending upon an implemented processing algorithm. In some cases, assertion of sync mark found signal 240 may be suppressed where it is identified as unreliable. In other cases, assertion of sync mark found signal 240 occurs along with an indication that it may not be reliable. In such a way, mis-detection may be avoided or at least the potential of mis-detection flagged.

In some embodiments of the present invention, the distance L2−L1 is replaced with a soft metric, D[k]max, that corresponds a maximum Euclidean distance that occurs between the assertion of end of preamble signal 230 and sync found signal 240 in accordance with the following equation:

$$D[k]\text{max} = \text{MAX}\left[\sum_{k=0}^{20}(ReceivedData[k] - KnownPreamblePattern[k])^2\right].$$

This soft metric is then compared with an expected distance threshold such that where the threshold is exceeded it is determined that the probability of detecting a false sync mark is significant and the asserted sync mark found signal 240 may be unreliable. In some cases, assertion of sync mark found signal 240 may be suppressed where it is identified as unreliable. In other cases, assertion of sync mark found signal 240 occurs along with an indication that it may not be reliable. In such a way, mis-detection may be avoided or at least the potential of mis-detection flagged.

Figure 3:
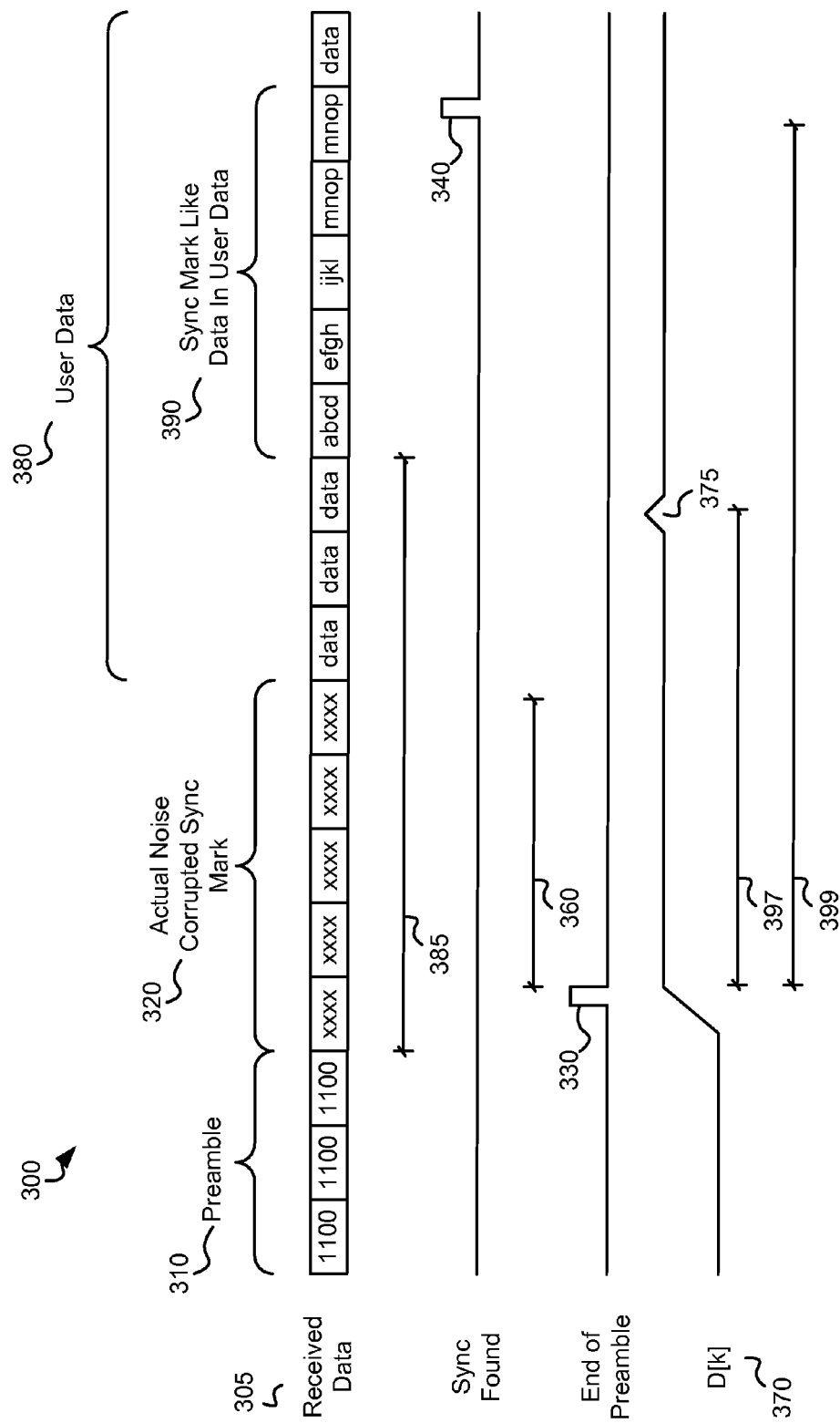
FIG. 3 is a timing diagram showing an example of assertion of a sync found signal beyond an expected window in accordance with one or more embodiments of the present invention

Turning to FIG. 3, a timing diagram 300 shows an example of assertion of a sync found signal 340 beyond an expected window 360. Following timing diagram 300, a received data 305 includes a preamble pattern 310, an actual noise corrupted sync mark 320, and user data 380. The user data 380 includes a sync mark like pattern 390 that begins a distance 385 from the beginning of actual noise corrupted sync mark 320. As described above in relation to FIG. 2, it is expected that preamble pattern 310 include a number of repeating bit series that are followed by a valid sync mark pattern. However, in this case, the sync mark pattern is noisy resulting in a failed detection (i.e., a failure to assert sync found signal 340 as a logic '1'). Sync mark like pattern 390 is not an intended sync mark, but rather a pattern within user data 380 that sufficiently resembles a sync mark pattern that it results in assertion of sync found signal 340.

Similar to that described above in relation to FIG. 2, an end of preamble signal 330 is asserted after the last of the repeating bit series are detected. In some embodiments of the present invention, the end of preamble signal 330 is detected by an end of preamble detector circuit that calculates a Euclidean distance between a defined number of bits of received data 305. In some embodiments of the present invention, the defined number of bits of received data 305 is twenty (20). The Euclidean distance (D[k]) is calculated in accordance with the following equation:

$$D[k] = \text{Euclidean Distance} = \sum_{k=0}^{20}(ReceivedData[k] - KnownPreamblePattern[k])^2,$$

where k indicates a particular bit pair being compared, and received data 305 and the preamble pattern are assumed to be aligned. The Euclidian distance (D[k]) is shown on timing diagram 300 as D[k] 370. Where received data 305 is error free, D[k] 370 will be zero, and will have a relatively low value where the signal is not overwhelmed by the noise. As shown, D[k] 370 increases dramatically at the transition between preamble 310 and the subsequent field (i.e., actual noise corrupted sync mark 320) of received data 305. The value of D[k] 370 will vary as actual noise corrupted sync mark 320 and user data 380 is received. An example variance 375 is shown where a maximum value of D[k] 370 is achieved at a distance 397 from assertion of end of preamble signal 330. Said another way, D[k]max occurs distance 397 from assertion of end of preamble signal 330.

A known sync mark pattern is also compared against received data 305, and sync found signal 340 is asserted as a logic '1' when a match is detected. In one embodiment of the present invention, a Euclidean distance between received data 305 and a known sync mark pattern is calculated in accordance with the following equation:

$$\text{Euclidean Distance} = \sum_{k=0}^{20}(ReceivedData[k] - KnownSyncMarkPattern[k])^2,$$

where k indicates a particular bit pair being compared. Where the calculated Euclidean distance is less than an SM threshold value, sync found signal 340 is asserted as a logic '1'. As previously noted, because of the corruption of actual noise corrupted sync mark 320, the calculated Euclidean distance is always greater than the SM threshold resulting in a failure to assert sync found signal 340 as a logic '1', but later the calculated Euclidean distance goes below the SM threshold coincident with receiving sync mark like pattern 390 resulting in assertion of sync found signal 340 as a logic '1'. This assertion of sync found signal 340 as a logic '1' occurs a distance 399 from assertion of end of preamble signal 330. In this case, the value of example variance 375 is greater than an expected distance threshold and the location of example variance (i.e., distance 397) is closer to the assertion of end of preamble signal 330 than the location of sync found signal 340 (i.e., distance 399), the assertion of sync found signal 340 is identified as unreliable and may be used or rejected depending upon an implemented processing algorithm. In some cases, assertion of sync mark found signal 340 may be suppressed where it is identified as unreliable. In other cases, assertion of sync mark found signal 340 occurs along with an indication that it may not be reliable. In such a way, mis-detection may be avoided or at least the potential of mis-detection flagged.

Figure 4A:
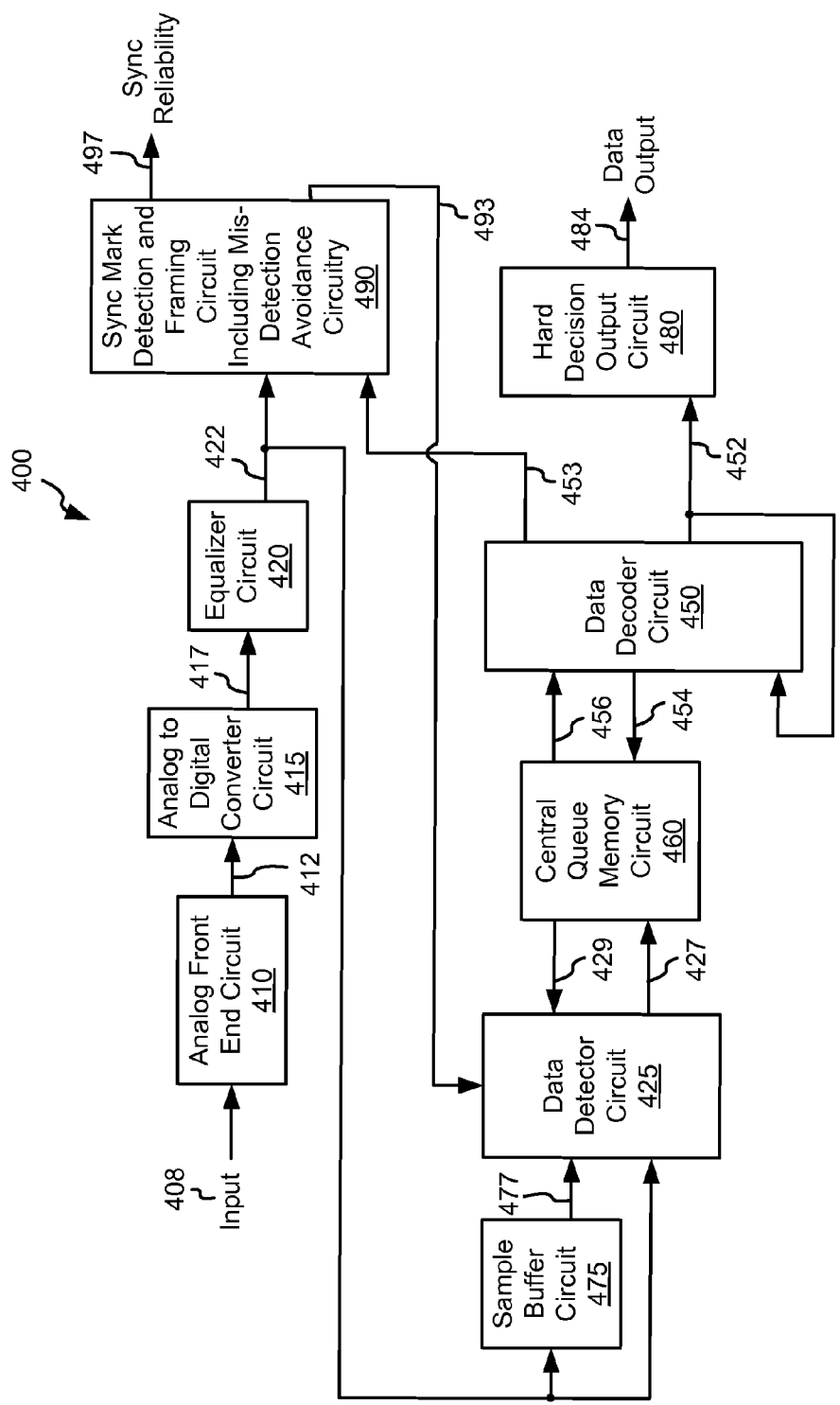
FIG. 4a depicts a data processing circuit including a sync mark detection and framing circuit including mis-detection avoidance circuitry in accordance with some embodiments of the present invention.

Turning to FIG. 4a, a data processing circuit 400 including a sync mark detection and framing circuit having sync mark mis-detection circuitry is shown in accordance with some embodiments of the present invention. Data processing circuit 400 includes an analog front end circuit 410 that receives an analog input 408. Analog front end circuit 410 processes analog input 408 and provides a processed analog signal 412 to an analog to digital converter circuit 415. Analog front end circuit 410 may include, but is not limited to, an analog filter and an amplifier circuit as are known in the art. Based upon the disclosure provided herein, one of ordinary skill in the art will recognize a variety of circuitry that may be included as part of analog front end circuit 410. In some cases, analog input 408 is derived from a read/write head assembly (not shown) that is disposed in relation to a storage medium (not shown). In other cases, analog input 408 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 408 may be derived.

Analog to digital converter circuit 415 converts processed analog signal 412 into a corresponding series of digital samples 417. Analog to digital converter circuit 415 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 417 are provided to an equalizer circuit 420. Equalizer circuit 420 applies an equalization algorithm to digital samples 417 to yield an equalized output 422. In some embodiments of the present invention, equalizer circuit 420 is a digital finite impulse response filter circuit as are known in the art.

Equalized output 422 is provided to a data detector circuit 425, a sample buffer circuit 475, and a sync mark detection and framing circuit 490. Sync mark detection and framing circuit 490 includes mis-detection avoidance circuitry that operates similar to that discussed above in relation to FIGS. 2-3. In particular, sync mark detection and framing circuit 490 compares equalized output 422 against a known preamble pattern. In one particular embodiment of the present invention, the comparison is achieved by calculating a distance value (D[k]) in accordance with the following equation:

$$D[k] = \text{Euclidean Distance} = \sum_{k=0}^{20}(EqualizedOutput[k] - KnownPreamblePattern[k])^2,$$

where k indicates a particular bit pair being compared, and equalized output 422 and the known preamble pattern are aligned. Where equalized output 422 is error free, the distance value (D[k]) will be zero, and will have a relatively low value where the signal is not overwhelmed by the noise. When equalized output 422 transitions from the preamble pattern to the next field (expected to be the sync mark pattern), the distance value increases dramatically. The distance value will vary as non-preamble fields are received. Once the expected number of preamble packets have been received, an end of preamble signal is asserted.

A known sync mark pattern is also compared against equalized output 422, and a framing signal (i.e., a sync mark found signal) 493 is asserted as a logic '1' when a match is detected. In one embodiment of the present invention, the comparison between equalized output 422 and the known sync mark pattern may be done by calculating a Euclidean distance between equalized output 422 and the known sync mark pattern in accordance with the following equation:

$$\text{Euclidean Distance} = \sum_{k=0}^{20}(ReceivedData[k] - KnownSyncMarkPattern[k])^2,$$

where k indicates a particular bit pair being compared. This Euclidean distance is compared with an SM threshold value, and where it is smaller than the SM threshold value, framing signal 493 is asserted as a logic '1'. Otherwise, framing signal 493 is not asserted. In some cases, the SM threshold value is a user programmed value. In other cases, the SM threshold value is a fixed value.

In addition, the distance value calculated as part of comparing equalized output 422 for each calculation period between assertion of the end of preamble signal and subsequent assertion of framing signal 493 are compared with an expected distance value. In some cases, the expected distance value is a user programmed value. In other cases, the expected distance value is a fixed value. Where the distance value is greater than the expected distance value, a sync reliability signal 497 is asserted to indicate the assertion of framing signal 493 may be unreliable. This reliability information may be used to either suppress the assertion of framing signal 493, or provided to a host (not shown) or error checking circuit (not shown) where it is used as an indication of a processing failure and/or in providing retry processing. In such a way, mis-detection may be avoided or at least the potential of mis-detection flagged. The aforementioned distance value and/or sync reliability output 497 may be more generically referred to as an example of a sync mark quality metric.

Sample buffer circuit 475 stores equalized output 422 as buffered data 477 for use in subsequent iterations through data detector circuit 425. Data detector circuit 425 may be any data detector circuit known in the art that is capable of producing a detected output 427. As some examples, data detector circuit 425 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 425 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention. Data detector circuit 425 uses framing signal 493 to determine the beginning point of codewords accessed from sample buffer circuit 475 for processing.

Detected output 427 is provided to a central queue memory circuit 460 that operates to buffer data passed between data detector circuit 425 and data decoder circuit 450. In some cases, central queue memory circuit 460 includes interleaving (i.e., data shuffling) and de-interleaving (i.e., data un-shuffling) circuitry known in the art. When data decoder circuit 450 is available, data decoder circuit 450 accesses detected output 427 from central queue memory circuit 460 as a decoder input 456. Data decoder circuit 450 applies a data decoding algorithm to decoder input 456 in an attempt to recover originally written data. The result of the data decoding algorithm is provided as a decoded output 452. Similar to detected output 427, decoded output 452 may include both hard decisions and soft decisions. For example, data decoder circuit 450 may be any data decoder circuit known in the art that is capable of applying a decoding algorithm to a received input. Data decoder circuit 450 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, decoded output 452 is stored to a memory included in a hard decision output circuit 480. In turn, hard decision output circuit 480 provides the converged decoded output 452 as a data output 484 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 452 indicates that the data is unusable as is more specifically discussed below, and data output 484 is similarly identified as unusable.

Data decoder circuit 453 additionally provides a framing signal selection signal 453 to sync mark detection and framing circuit 490 that causes sync mark detection and framing circuit 490 to provide a next best framing signal 493. Equalized output 422 is then re-processed using the new framing signal 493 indicating a different starting location of user data in equalized output 422. In some embodiments of the present invention, framing signal selection signal 453 is asserted to cause another framing signal to be provided under particular conditions. Such conditions may include, for example, a failure of data decoder circuit 450 to converge after a defined number of global iterations, and/or where a number of unsatisfied checks exceed a defined level after a defined number of global iterations have occurred in relation to the currently processing data set. Based upon the disclosure provided herein, one of ordinary skill in the art will recognize a variety of conditions upon which a next best framing signal is selected to restart the processing.

One or more iterations through the combination of data detector circuit 425 and data decoder circuit 450 may be made in an effort to converge on the originally written data set. As mentioned above, processing through both the data detector circuit and the data decoder circuit is referred to as a "global iteration". For the first global iteration, data detector circuit 425 applies the data detection algorithm to equalized output 422 without guidance from a decoded output. For subsequent global iterations, data detector circuit 425 applies the data detection algorithm to buffered data 477 as guided by decoded output 452. To facilitate this guidance, decoded output 452 is stored to central queue memory circuit 460 as a decoder output 454, and is provided from central queue memory circuit 460 as a detector input 429 when equalized output 422 is being re-processed through data detector circuit 425.

During each global iteration it is possible for data decoder circuit 450 to make one or more local iterations including application of the data decoding algorithm to decoder input 456. For the first local iteration, data decoder circuit 450 applies the data decoder algorithm without guidance from decoded output 452. For subsequent local iterations, data decoder circuit 450 applies the data decoding algorithm to decoder input 456 as guided by a previous decoded output 452. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 450 exceeds that allowed, but it is determined that at least one additional global iteration during standard processing of the data set is allowed, decoded output 452 is provided back to central queue memory circuit 460 as decoded output 454. Decoded output 454 is maintained in central queue memory circuit 460 until data detector circuit 425 becomes available to perform additional processing.

In contrast, where the number of local iterations through data decoder circuit 450 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

Figure 4B:
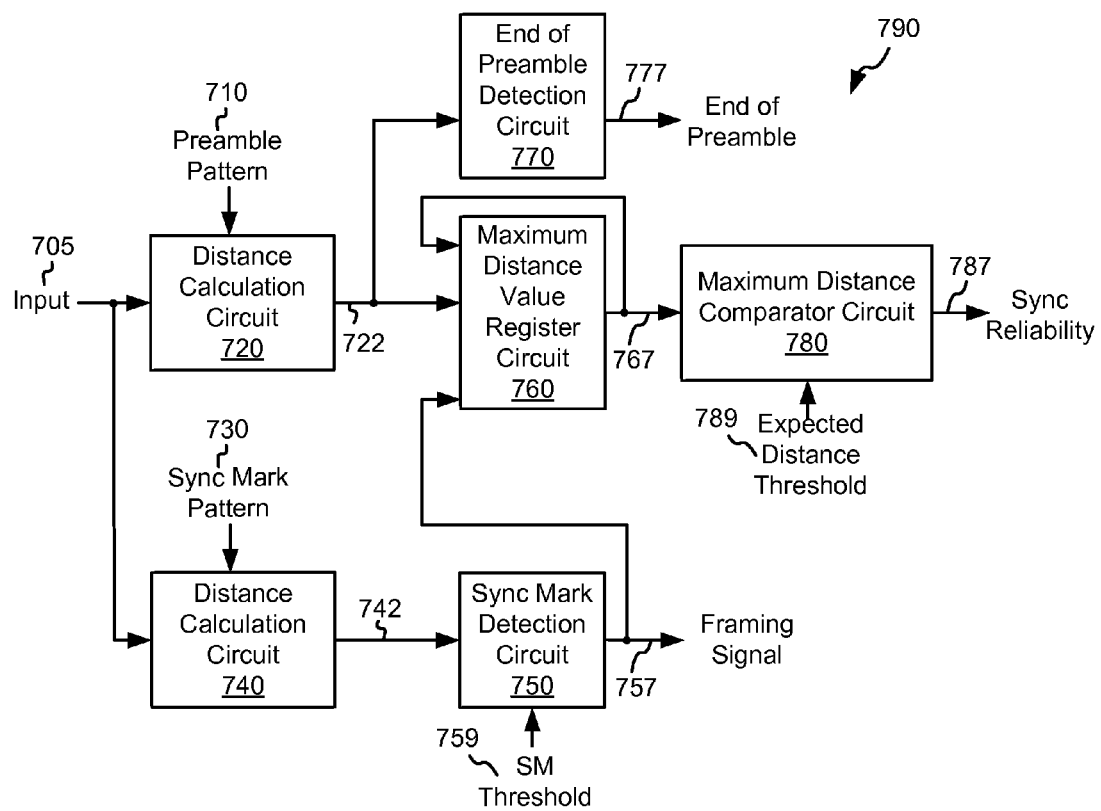
FIG. 4b shows an example implementation of a sync mark detection and framing circuit including mis-detection avoidance circuitry in accordance with one or more embodiments of the present invention.

Turning to FIG. 4b, an example implementation of a sync mark detection and framing circuit 790 including mis-detection avoidance circuitry is shown in accordance with one or more embodiments of the present invention. Sync mark detection and framing circuit 790 may be used in place of sync mark detection and framing circuit 490 discussed above in relation to FIG. 4a where an input 705 is connected to equalized output 422, a framing signal 757 is connected to framing signal 493, and a sync reliability signal 787 is connected to sync reliability signal 497. Distance 767 and/or sync reliability signal 787 may be more generically referred to as an example of a sync mark quality metric.

As shown, sync mark detection and framing circuit 790 includes a distance calculation circuit 720 operable to calculate a distance (D[k]) 722 between input 705 and a known preamble pattern 710 in accordance with the following equation:

$$D[k] = \text{Euclidean Distance} = \sum_{k=0}^{20} (\text{Input}[k] - \text{KnownPreamblePattern}[k])^2,$$

where k indicates a particular bit pair being compared, and input 705 and the known preamble pattern are aligned. Where input 705 is error free, distance (D[k]) 722 will be zero, and distance (D[k]) 722 will have a relatively low value where the signal of input 705 is not overwhelmed by the noise. When input 705 transitions from the preamble pattern to the next field (expected to be the sync mark pattern), distance (D[k]) 722 increases dramatically. Distance (D[k]) 722 will vary as non-preamble fields are received. Distance (D[k]) 722 is provided to an end of preamble detection circuit 770 that asserts an end of preamble signal 777 when the end of a preamble is identified.

In addition, distance (D[k]) 722 is provided to a maximum distance value register circuit 760 that is operable to compare distance (D[k]) 722 with a previously stored distance value 767 to determine which is greater, and to retain the greater of the two as distance value 767. The distance value 767 stored in maximum distance value register circuit 760 is set equal to zero when framing signal 757 is asserted indicating that a sync mark was found. Distance value 767 is provided to a maximum distance comparator circuit 780 where it is compared with an expected distance threshold 789. Expected distance threshold 789 may be either fixed or user programmable. Where distance value 767 is greater than expected distance threshold 789, maximum distance comparator circuit 780 asserts sync reliability signal 787 to indicate that a subsequent assertion of framing signal 757 is unreliable.

In addition, a distance calculation circuit 740 calculates a distance 742 between input 705 and a known sync mark pattern 730 in accordance with the following equation:

$$\text{Distance} = \sum_{k=0}^{20} (\text{Input}[k] - \text{KnownSyncMarkPattern}[k])^2,$$

where k indicates a particular bit pair being compared. Distance 742 is provided to a sync mark detection circuit 750 that is operable to compare distance 742 with an SM threshold 759. SM threshold 759 may be either fixed or user programmable. Where distance 742 is less than SM threshold value 759, framing signal 757 is asserted to indicate that a sync mark signal has been found.

Figure 5:
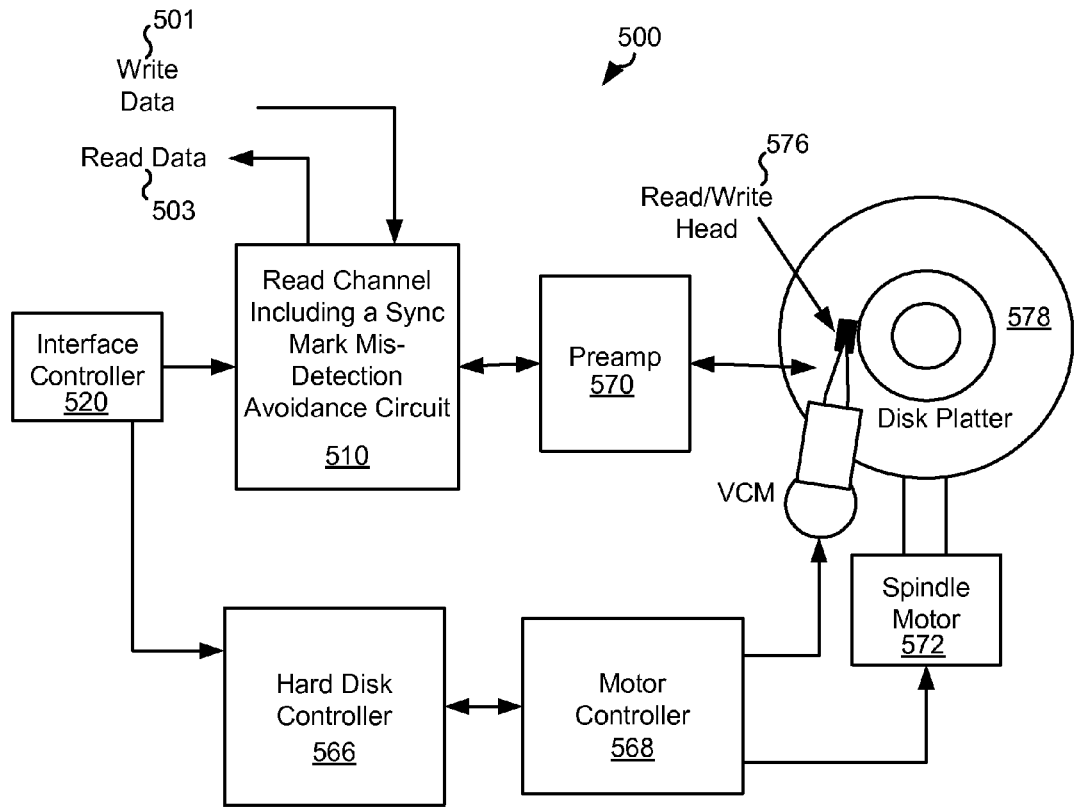
FIG. 5 shows a storage system including a sync mark mis-detection avoidance circuit in accordance with some embodiments of the present invention.

Turning to FIG. 5, a storage system 500 including a read channel circuit 510 with a sync mark mis-detection avoidance circuitry is shown in accordance with various embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 564 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. As part of decoding the received information, read channel circuit 510 performs a sync mark detection process. Such a sync mark detection process may be performed using any detection process known in the art. The sync mark detection is enhanced to avoid mis-detection by assuring that the sync mark is identified within a defined window after the occurrence of a preceding detection. In some embodiments of the present invention, the preceding detection is an end of preamble detection. Read channel circuit 510 may be implemented similar to that discussed above in relation to FIGS. 4a-4b, and the mis-detection avoidance may operate similar to that discussed above in relation to FIGS. 2-3.

It should be noted that storage system 500 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 500, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 510 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 500 may be modified to include solid state memory that is used to store data in addition to the storage offered by disk platter 578. This solid state memory may be used in parallel to disk platter 578 to provide additional storage. In such a case, the solid state memory receives and provides information directly to read channel circuit 510. Alternatively, the solid state memory may be used as a cache where it offers faster access time than that offered by disk platted 578. In such a case, the solid state memory may be disposed between interface controller 520 and read channel circuit 510 where it operates as a pass through to disk platter 578 when requested data is not available in the solid state memory or when the solid state memory does not have sufficient storage to hold a newly written data set. Based upon the disclosure provided herein, one of ordinary skill in the art will recognize a variety of storage systems including both disk platter 578 and a solid state memory.

Figure 6:
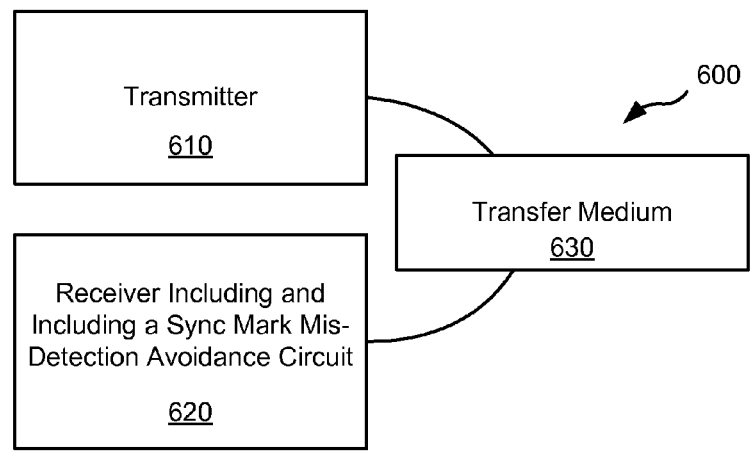
FIG. 6 depicts a communication system including a sync mark mis-detection avoidance circuit in accordance with different embodiments of the present invention.

Turning to FIG. 6, a communication system 600 including a receiver 620 with a ratio metric based sync mark detector circuit is shown in accordance with different embodiments of the present invention. Communication system 600 includes a transmitter 610 that is operable to transmit encoded information via a transfer medium 630 as is known in the art. The encoded data is received from transfer medium 630 by receiver 620. As part of decoding the received data, receiver 620 performs a sync mark detection process. Such a sync mark detection process may be performed using any detection process known in the art. The sync mark detection is enhanced to avoid mis-detection by assuring that the sync mark is identified within a defined window after the occurrence of a preceding detection. In some embodiments of the present invention, the preceding detection is an end of preamble detection. Receiver 620 may be implemented similar to that discussed above in relation to FIGS. 4a-4b, and the mis-detection avoidance may operate similar to that discussed above in relation to FIGS. 2-3.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing.

While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   a sync mark detection circuit operable to identify a predefined pattern in a received data set, wherein identification of the predefined pattern results in asserting a sync found output at a first location;
   a distance calculation circuit operable to determine a distance from a second location of a preceding occurrence to the first location assertion of the sync found output, wherein the second location is different from the first location; and
   a sync output circuit operable to assert a sync mark detected output corresponding to the sync found output when the distance is less than a threshold value.

2. The data processing system of claim 1, wherein the threshold value is programmable.

3. The data processing system of claim 1, wherein the threshold value is greater than the length of the predefined pattern.

4. The data processing system of claim 1, wherein the received data set further includes a preamble pattern, and wherein the preceding occurrence is a detected end of the preamble pattern.

5. The data processing system of claim 4, wherein the preamble pattern is a defined length.

6. The data processing system of claim 5, wherein the defined length is greater than the length of the predefined pattern.

7. The data processing system of claim 1, wherein the sync output circuit is further operable to assert a mis-identified sync output when the sync found output is asserted when the distance is greater than the threshold value.

8. The data processing system of claim 1, wherein the system is implemented as part of an integrated circuit.

9. The data processing system of claim 1, wherein the system is implemented as part of a device selected from a group consisting of: a storage device and a wireless communication device.

10. The data processing system of claim 1, wherein the received data is derived from a user data region of a storage medium.

11. The data processing system of claim 10, wherein the preceding occurrence is within the user data region of the storage medium.

12. The data processing system of claim 10, wherein the preceding occurrence is within a servo data region of the storage medium, and wherein the servo data region directly precedes the user data region.

13. A data processing system, the system comprising:
    a sync mark detection circuit operable to identify a predefined pattern in a received data set, wherein identification of the predefined pattern results in asserting a sync found output, and wherein a preamble pattern precedes the predefined pattern in the received data set;
    a sync quality output circuit operable to provide a sync mark quality metric indicating a similarity between the preamble pattern and the received data set within a region preceding the predefined pattern; and a sync output circuit operable to assert a sync mark detected output corresponding to the sync found output when the sync mark quality metric is less than a threshold value.

14. The data processing system of claim 13, wherein the threshold value is programmable.

15. The data processing system of claim 14, wherein the threshold value is greater than the length of the predefined pattern.

16. The data processing system of claim 13, wherein the sync output circuit is further operable to assert a mis-identified sync output when the sync found output is asserted when the distance is greater than the threshold value.

17. The data processing system of claim 13, wherein the system is implemented as part of an integrated circuit.

18. The data processing system of claim 13, wherein the system is implemented as part of a device selected from a group consisting of: a storage device and a wireless communication device.

19. The data processing system of claim 13, wherein the received data is derived from a user data region of a storage medium.

* * * * *